Feb. 4, 1969  H. BUTZ  3,425,191

WET SEPARATOR FOR CLEANING DUST-LADEN GASES

Filed Jan. 24, 1966

Inventor:
H. Butz
By Richards & Geier
ATTORNEYS

United States Patent Office 3,425,191
Patented Feb. 4, 1969

3,425,191
WET SEPARATOR FOR CLEANING DUST-LADEN GASES
Heinz Butz, Schwarzenbachweg 17, Zurich, Switzerland
Filed Jan. 24, 1966, Ser. No. 522,461
U.S. Cl. 55—223        2 Claims
Int. Cl. B01d 47/02

ABSTRACT OF THE DISCLOSURE

A washer for gases having a grid, a tank under the grid, tubes immersed in the tank and extending through the grid to cause water in the tank to flow by suction above the grid and form a bubbling bath and discharge channels for silt and dust which extend into the tank.

---

Figure 1:
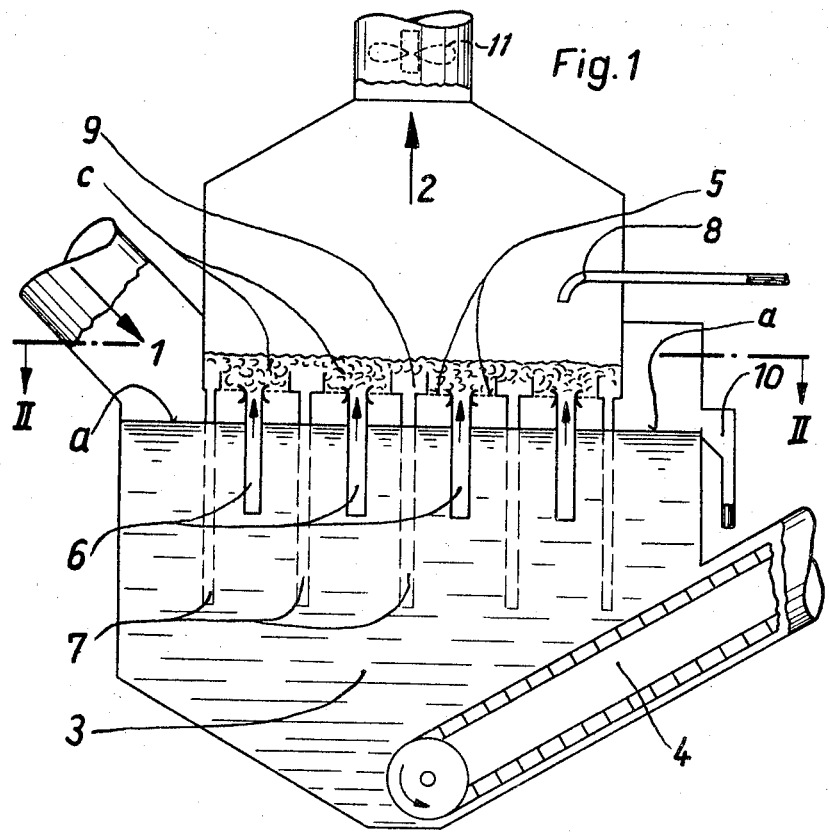

This invention relates to a wet separator or washer for removing or elutriating dust from air or other gases.

Washers known in prior art can be divided into two groups, whereby in the first group, the separator generally consists of an upright container. At the bottom it contains a tank for fluid, usually water upon which the gas to be washed is caused to impinge so that it passes through the water to undergo a first washing action to remove part of the dust therein contained. Baffles or other impediments to the flow are arranged above this tank, and these baffles are sprayed from below or from above with circulating water or fine slurry. In this secondary filter part the precleaned gas comes a second time into intimate contact with the water and a further part of its dust is removed. Pumps are used to convey the water from the tank into the second separation stage. The water, converted into silt by the dust which it has taken up, sinks down into the water tank. The finely cleaned gas on the other hand is removed by a suction fan through a connection in the tank cover.

In the second group, the gas firstly meets the surface of water in a container, and a part of its dust is separated out onto this surface, the surface water, laden with dust, being subsequently removed from the cleaned gas by a whirling device, in which a second separating surface is produced by this current, in which surface the fluid is subsequently laden with gas. The silt subsequently sinks back into the water tank, namely, in that part which is located in the direction of the gas stream seen in the whirling direction. A delivery pump for the water is not necessary in this construction because a fan usually blows the air through the separating zone and the air carries the water along with it.

An object of the present invention is to improve prior art devices and to provide a wet separator cleaning the crude gas in at least two stages. It is a further object to provide a separator which is insensitive to coarse dust and to avoid the use of pumps and nozzles. Yet another object is to provide a separator which will make it possible for fine silt to be led to the fine cleaning stage in a selectable amount in the state which is most favorable for the actual type of cleaning.

A further object of the present invention is to provide means for dividing this delivery of fine silt to the fine cleaning stage in a uniform and constant manner, and for introducing this fine silt from below into the bubbling bed in a gushing manner, whereby a very uniform action on the bubbling motion of the bed is possible and an additional safety is ensured by all additional fluid being conveyed into the bubbling bed, and therefore the fine cleaning is improved; on the other hand no drops injected from above are prematurely carried along by the rising clean gas.

In the attainment of the objectives of the present invention it was found desirable to use appropriate structural parts from not only the first but also from the second group of washers hereinabove referred to. However, the construction of the present invention is different from both of the groups in two important and advantageous respects. Compared with the first group, its advantage consists in that no circulating pump is necessary for conveying the fluid from the tank into the bubbling bed. Therefore the maintenance of the pump, as well as the nozzles and regulating cocks belonging thereto, is eliminated.

Compared with the second group, the construction of the present invention offers the advantage that the fluid is taken from any depth of the tank and is conveyed to the second cleaning stage. Therefore the surface water of the first cleaning stage already laden with coarse dust finds no use in the second stage.

An embodiment of the present invention consists in a wet separator for cleaning dust-laden gas, comprising a liquid tank, means for causing inflowing gas to impinge on the liquid in said tank, a fine cleaning stage have baffles, a liquid bubbling bed arranged above said baffles, the gas passing through said baffles and said bed before leaving the separator, said liquid tank containing a number of tubes immersed therein, through which the liquid rises to reach the bubbling bed. The tubes may be of any desired length.

This mode of operation which is fundamentally different from that of prior art is advantageous particularly in the cleaning of such gases, which in addition to very fine dust also contain light floating particles of larger dimensions, such as threads, fibers, pieces of fabric, paper and flakes. This amount of coarse dust already separated at the first impact on the fluid surface is not carried along by the fluid and therefore reaches neither the fine dust-removing stage nor the area of intimate contact between finely-divided gas and finely-divided liquid. Thus the danger that coarser particles may give rise to blockages in the narrow sections of the fittings in the flow channels serving for fine separation is effectively avoided.

Furthermore, the invention offers advantages in such cases in which particular value is laid where no drops of fluid, which are sprayed from above onto the bubbling bed, are carried away unused by the stream of clean gas from the wet separator.

The invention will appear more clearly from the following detailed description when taken in connection with the accompanying drawing showing by way of example a preferred embodiment of the inventive idea.

Figure 2:
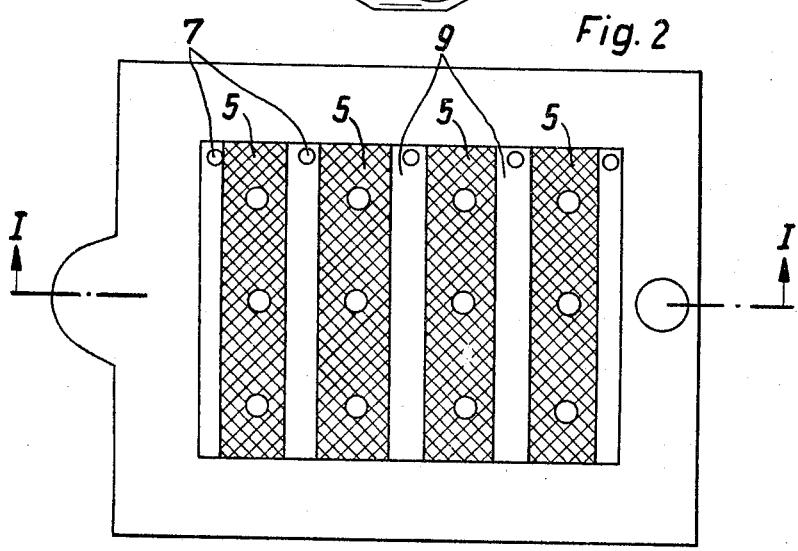

In the drawing:

FIGURE 1 is a section through a wet separator along the line I—I of FIGURE 2, and FIGURE 2 is a cross section through the separator along the line II—II of FIGURE 1.

In the wet separator shown in the drawing the gas enters the filter through a connection 1, impinges upon the surface of the fluid in a space $a$, rises through a grid 5 and leaves the wet separator through an outlet 2 to reach a suction fan 11. Due to the lower pressure existing above the space $a$, the fluid rises from the tank 3 through tubes 6 which are immersed to any depth in the tank 3, until it has passed the grid 5. The fluid forms a bubbling layer $c$ together with the gas passing through. The fluid falls back into the tank 3 from this layer through discharge channels 9 and tubes 7. The dust, which enters with the gas through the connection 1, separates out its coarse constituents on meeting the surface of the tank 3. The fine dust need only be separated in the space $c$ which contains the bubbling bed. The fine dust, together with the fluid, falls through the discharge channels 9 into the tank 3, in the form of fine silt.

The fine cleaning stage, with mechanically operating baffles or other impediments to the flow, which is located between the tank and the bubbling bed, consists only of the grid 5.

However, instead of this grid any other suitable filter means can be used, such as for example, perforated sectioned plates. These mechanical flow impediments may consist of metal, plastic or other known suitable material.

The tubes 6 may be arranged in the grid 5 so as to be longitudinally movable, by means of sleeves (not shown), in order that they can be individually adjusted in height or depth of immersion even during the operation of the separator.

The silt, which is deposited in the tank 3, is removed by a discharge device schematically shown at 4.

However, any suitable draining device may be used for this purpose. The floating dust flows out through an overflow 10. The necessary supplementary water, which replaces the water which has been lost by evaporation and outflow of silt, flows in through the pipe 8.

What is claimed is:

1. A wet separator for cleaning dust-laden gas, comprising in combination, a tank adapted to contain a body of liquid having an upper surface at a predetermined level in said tank, a downwardly directed pipe located above said tank and connected therewith above said predetermined level for causing the dust-laden gas to impinge upon the upper surface of the liquid in the tank, a horizontally elongated perforated grid spaced from said pipe connection and spaced vertically above said predetermined level, first tubes immersed in said tank and having upper ends carried by said grid and lower ends extending below said predetermined level, said tubes extending in parallel rows, means constituting a chamber having a bottom encompassing said grid and attached to all points of the periphery of said grid, said chamber having an outlet spaced from and located above said grid, the periphery of the lower end of said chamber being sealed to said tank so that all gas entering said tank must pass through said chamber, fan means in said outlet, said fan means providing air suction in said chamber for drawing liquid from the tank through said tubes into a space directly above said grid and forming a liquid bubbling bed in said space, discharge means carried by said grid and located between the rows of said tubes, said discharge means having upwardly extending edges located in said space, said edges terminating above said grid and defining overflow wiers, second tubes communicating with said discharge means and extending into said tank below said grid and below said first tubes to enable portions of said liquid bubbling bed to drop to the bottom of said tank, there being a plurality of perforations in said grid between said first tubes and said discharge means, an overflow removing pipe connected with said tank and located below said grid and at said predetermined level for maintaining the upper surface of said liquid body at said predetermined level below said pipe and said perforated grid, means for adding make up liquid to said body of liquid, and a dust discharging device connected with the bottom of said tank.

2. A wet separator in accordance with claim 1, wherein said device is a dust discharging and conveying device connected with the bottom of said tank which positively effects removal of the collected dust from said tank rather than merely permitting such removal.

References Cited

UNITED STATES PATENTS

| 980,977 | 1/1911 | Little | 55—250 |
|---|---|---|---|
| 1,719,254 | 7/1929 | Wofford | 261—119 X |
| 2,015,174 | 9/1935 | Anglemyer | 55—251 X |
| 2,070,578 | 2/1937 | Bowman | 55—223 X |
| 2,091,421 | 8/1937 | Sherman | 55—249 X |
| 2,300,417 | 11/1942 | Hall | 55—248 X |
| 2,736,390 | 2/1956 | Wickland | 55—248 X |
| 2,966,958 | 1/1961 | Sexton | 55—250 X |
| 3,130,024 | 4/1964 | Vaughan | 55—248 X |
| 764,049 | 7/1904 | Guldlin. | |
| 3,105,105 | 9/1963 | Kittel | 261—114 X |

FOREIGN PATENTS

| 223,586 | 9/1962 | Austria. |
|---|---|---|
| 867,330 | 7/1941 | France. |
| 1,077,665 | 5/1954 | France. |
| 1,353,942 | 1/1964 | France. |
| 338,827 | 5/1919 | Germany. |
| 526,811 | 9/1940 | Great Britain. |
| 504,843 | 12/1954 | Italy. |
| 53,951 | 1/1911 | Switzerland. |
| 870,241 | 3/1953 | Germany. |

OTHER REFERENCES

Kittel, Walter, German printed application (H), No. 1,089,729, printed September 1960 (copy in group 177, class 261, subclass 114 J.P.).

HARRY B. THORNTON, *Primary Examiner.*

DENNIS E. TALBERT, JR., *Assistant Examiner.*

U.S. Cl. X.R.

261—113, 119; 55—225, 227, 256.